(12) United States Patent
Franzki et al.

(10) Patent No.: US 11,985,230 B2
(45) Date of Patent: May 14, 2024

(54) CONCURRENT MASTERKEY CHANGES FOR REDUNDANT HSMS

(71) Applicant: INTERNATIONAL BUSINESS MACHINES CORPORATION, Armonk, NY (US)

(72) Inventors: Ingo Franzki, Schoenaich (DE); Reinhard Theodor Buendgen, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 17/655,055

(22) Filed: Mar. 16, 2022

(65) Prior Publication Data
US 2023/0299943 A1  Sep. 21, 2023

(51) Int. Cl.
*H04L 9/08*  (2006.01)

(52) U.S. Cl.
CPC .......... *H04L 9/0825* (2013.01); *H04L 9/0877* (2013.01); *H04L 9/0891* (2013.01)

(58) Field of Classification Search
CPC ... H04L 9/0825; H04L 9/0877; H04L 9/0891; H04L 9/0894; H04L 9/0822
See application file for complete search history.

(56) References Cited

U.S. PATENT DOCUMENTS

| | | | |
|---|---|---|---|
| 9,608,813 | B1 | 3/2017 | Roth |
| 10,601,782 | B2 * | 3/2020 | Shetty ..................... H04L 67/10 |
| 2017/0286697 | A1 * | 10/2017 | Shetty .................. H04L 67/1097 |
| 2017/0286698 | A1 * | 10/2017 | Shetty ..................... H04L 67/10 |
| 2019/0007202 | A1 | 1/2019 | Colombo |
| 2020/0053065 | A1 * | 2/2020 | Wisniewski ............ H04L 63/06 |
| 2020/0169401 | A1 * | 5/2020 | Dooley ................. H04L 9/0822 |

FOREIGN PATENT DOCUMENTS

| | | | |
|---|---|---|---|
| CN | 111464301 A | 7/2020 | |
| WO | WO-2020126235 A1 * | 6/2020 | ........... H04L 9/0825 |
| WO | WO-2023078639 A1 * | 5/2023 | |

OTHER PUBLICATIONS

Notification of Transmittal of the International Search Report and the Written Opinion of the International Searching Authority, or the Declaration for Application PCT/EP2023/054197, dated Apr. 21, 2023, 10 pages.

(Continued)

*Primary Examiner* — Mohammed Waliullah
(74) *Attorney, Agent, or Firm* — Stosch Sabo

(57) ABSTRACT

A method for updating a current master key (MK) with a new MK, protected by an HSM, while a software component using a key is active, is disclosed. The method comprises signaling that a new master key has been loaded to the HSMs, re-encrypting the key encrypted with the current MK, storing the re-encrypted key as respective newKey component of a key object, wherein a current key is stored in a curKey component of the key object, and setting the new MK in a first HSM, and signaling to the active software component that the new MK is set in at least one of the HSMs. Upon determining that the new MK is set in the HSM, restricting usage of the HSMs to the selected HSM, and upon determining that the new MK is set in all HSMs, moving the value of the newKey to the curKey component.

20 Claims, 9 Drawing Sheets

(56) References Cited

OTHER PUBLICATIONS

Cyberark Docs., "Rotate the master key", 4 PGS, Downloaded Mar. 9, 2022, <https://docs.cyberark.com/Product-Doc/OnlineHelp/AAM-DAP/Latest/en/Content/Deployment/MasterKeyEncryption/Masterkeyrotation.htm>.

IBM Documentation., "Master Key REST Service", IBM Security Guardium Key Lifecycle Manager/4.1.1, Last Updated Feb. 15, 2022, 6 PGS, <https://www.ibm.com/docs/en/sgklm/4.1.1?topic=apis-master-key-rest-service>.

Mell et al., "The NIST Definition of Cloud Computing", National Institute of Standards and Technology, Special Publication 800-145, Sep. 2011, 7 pages.

Rafaeli, et al. " A Survey of Key Management for Secure Group Communication," ACM Computing Surveys, Sep. 2003, pp. 309-329, vol. 35., No. 3.

Saidov, et al., "Hardware Interlocking Security System with Secure Key Update Mechanisms in IoT Environments," JKIECS, Aug. 1, 2017, pp. 671-678, vol. 12, No. 04.

\* cited by examiner

CONCURRENT MASTERKEY CHANGES FOR REDUNDANT HSMS

BACKGROUND

The present disclosure relates to computer security, and, more specifically, to updating a current master key with a new master key protected by hardware security modules (HSM).

The security of data and communication channels is a high priority for the management of corporate IT (information technology). This is not only necessary due to government regulations (e.g., GDPR, EU General Data Protection Regulation), but also due to a loss of credibility with companies in being able to reliably protect customer data at all times—and thus avoiding loss of sales and profits—in the event of compromised customer data records. Furthermore, data protection and providing secure computing platforms is not only a software problem, but it is also relevant to hardware modules. For example, in the highly trusted enterprise-class computing environments, such as those used in the financial, insurance, or government industries, it is essential to be able to demonstrate that from a technological perspective, data breaches have a high probability of being prevented. This may require additional high-tech components and supporting processes. However, the associated success in terms of data security overshadows any additional effort and/or cost that may be required.

Although hardware security modules (HSMs) have been in use for some time, synchronizing master keys in multiple HSMs and software components that use the HSMs' service is far from trivial. Nonetheless, there are some disclosures related to a computer-implemented method for changing HSM master keys. E.g., the document US 2020/0169401 A1 describes systems and techniques for changing cryptographic keys in high-frequency transaction environments to mitigate service disruption or loss of transactions associated with key maintenance. Thereby, a server device can employ a working key encrypted with a first master key to decrypt messages being communicated from a client device, whereby each message is encrypted with a first cryptogram that was generated based on the working key encrypted with the first master key. Additionally, the document US 2020/0053065 A1 describes a set of hardware security modules in a database system that implements a key management system with a database storing encryption keys or other secrets. A set of HSMs may identify a first key encryption key (KEK) and a second key encryption key stored in the set of HSMs. This set of HSMs may retrieve, from the database, a set of encryption keys encrypted by the first KEK and decrypt each encryption key of the set of encryption keys using the first KEK. Then, the set of HSMs may re-encrypt each encryption key of the set of encryption keys with a second KEK and transmit, to the database, the set of encrypted encryption keys encrypted by the second KEK for storage.

HSM key changes require special attention as they affect active software components that use the services of a plurality of HSMs. The master key, protected in one or more HSMs, may be used by software components to protect the local keys. Thus, whenever the master keys on the HSMs need to be changed—also known as "key roll"—all local keys encrypted with the actual master key must be re-encrypted by the new master key, protected by the HSMs. This is typically a multi-step process, where steps to set-up a new master key in the HSMs and steps to re-encrypt already encrypted keys must be carefully coordinated.

Known problems in such environments can be identified in the context of performing a master key roll and a local key re-encryption while the software component using the encrypted keys continues to be executed. One solution may be that encrypted local keys may be stored to a file and shared by multiple processes. Furthermore, the encrypted keys may be temporary objects in the address space of a process relating to the executing software component. Furthermore, the master key used to encrypt local keys may be stored in multiple redundant HSMs which are accessible by the software component. However, technologies such as openCryptoki or CCA (Common Cryptographic Architecture) cannot yet elegantly meet this requirement.

Hence, all potential solutions may require special handling and often the support of administrators. Therefore, there may be a need to overcome this clumsy process of master key roll activities and prepare it for better automation characteristics so that no special treatment or human interaction may be required.

SUMMARY

According to one aspect of the present disclosure, a method for updating a current master key with a new master key may be provided, both protected by one or more hardware security modules (HSM), while a software component that uses one or more keys, each protected by the current master key encrypted, is active. The method may comprise signaling to the active software component that a new master key has been loaded to the one or more HSMs, re-encrypting, by the software component, the one or more keys encrypted with the current MK, storing the re-encrypted one or more keys each in a respective newKey component of a respective key object used by the active software component, where a respective current key, encrypted by the current MK, is stored in a respective curKey component of the respective key object. The method may further comprise setting the new master key in a first of the HSMs, and signaling to the active software component that the new master key is set in at least one of the HSMs. The method also comprises upon determining, by the software component, that the new master key is set in at least one HSM, restricting, by the software component, the use of the HSMs to a selected single one of the HSMs, using a respective value stored in a key component selected from the group consisting of: the respective curKey component, and the respective newKey component, and upon determining that the new master key is set in all HSMs, moving the value of the respective newKey component to the respective curKey component in all key objects.

According to another aspect of the present disclosure, a concurrent master key change system for updating a current master key with a new master key may be provided. The system may comprise a processor and a memory, communicatively coupled to said processor, wherein the memory stores program code portions that when executed, may enable the processor, to signal to the active software component that a new master key has been loaded to the one or more HSMs, to re-encrypt, by the software component, the one or more keys encrypted with the current master key, to store the re-encrypted one or more keys each in a respective newKey component of a respective key object used by the active software component, where a respective current key, encrypted by the current MK, is stored in a respective curKey component of the respective key object, to set the new master key in a first of the HSMs, and to signal to the active software component that the new master key is set in at least one of the HSMs. The processor may further be enabled to: upon determining, by the software component that the new master key is set in at least one HSM, restrict, by the software component, the use of the HSMs to a selected single one of the HSMs, using a respective value stored in a key component selected from the group consisting of: the respective curKey component, and the respective newKey component, and upon determining that the new master key is set in all HSMs, move the value of the respective newKey component to the respective curKey component in all key objects.

The proposed method for updating a current master key with a new master key, while a software component is active may offer multiple advantages, technical effects, contributions and/or improvements. In the context of a secure master key management using HSMs, a change of the master key may represent a difficult situation under which normally other keys encrypted with a master key cannot be used in a continuous way. I.e., normally—using known technologies—using the "normal keys" encrypted by the master key should be stopped until the master key change or master key roll is finished. However, for many high-availability applications this is a heavy burden in terms of guaranteed up-times of applications and systems. This dilemma may successfully be addressed by the concept proposed in the present disclosure.

More specifically, a differentiation between a current key (curKey) and a new key (newKey), which may be encrypted by the current master key and the new master key, may solve the above-mentioned dilemma. Hence, the software component or application using services of one or more HSMs for encrypting the local keys may remain active, i.e., continue its execution. It does not have to be stopped until the key roll of the master key in the HSM is completed. This may represent a major advantage of continuously running applications, e.g., for banking applications, transactional systems in online sales operations as well as for continuous manufacturing processes. Other examples may also exist.

The proposed concept may also the address cases in which the software component that is actually executed includes multiple (sub-)processes or services that share secure keys stored in a key repository. It may also use include multiple HSMs—which may all be configured to use the same MKs—to increase redundancy and/or throughput. Accordingly, the proposed concepts may allow to reduce the requirements for synchronization among multiple processes, services or application components by selecting the usage of a single HSM during the critical MK roll phase. At the same time, requirements or impacts of the redundancy and/or throughput may be reduced by allowing as many operations as possible outside the critical MK roll phase.

In the following, additional embodiments of the present disclosure—applicable for the method as well as for the system—will be described.

According to one advantageous embodiment, the method may also comprise signaling a respective event to the active software component, when it has been determined by an HSM event signaling tool that a master key load operation or a master key set operation has taken place on one of the HSM. This may allow or enable the active software component to respond appropriately, e.g., by adopting local or temporary keys relating to the software component. Therefore, the key handling may be organized in a way not disturbing the business or other technical process supported by the software component. I.e., the master key roll process has come into effect outside the HSMs and the related software components.

According to another advantageous embodiment, the method may also comprise re-encrypting key objects persistently stored in a key repository when it has been determined by the HSM event signaling that a master key load operation has occurred on the one or more HSMs. This means that the software component—in particular one or more of them—may take care of a proper handling of the local keys—i.e., local to the software—by decrypting the existing encrypted key and re-encrypting it with the new master key. Thus, seamless operations may be realized. In addition, keys that are stored in a key repository and are not temporary may also be re-encrypted in the manner described above.

According to again another advantageous embodiment, the method may comprise moving a value of the newKey component of the key object to the curKey component of the key object persistently stored in a key repository if it has been determined by the HSM event signaling tool that the master key set operations have been performed on all HSMs. Thereby, the newKey component and the curKey component should be part of the same key object. Thus, the curKey component of the key object holds now the old "actual key" which was encrypted using the old—i.e., not actual—master key.

According to another advantageous embodiment of the method, the determining, by the software component, that the new master key is set in at least one HSM may also comprise (i) receiving—by the software component—a new-MK-set signal (new-master-key-set signal), or (ii) determining—by the software component—that an error code has been received indicative of a usage of a curKey component of a local key which was encrypted with an outdated master key, i.e., with the previous master key. Therefore, for the determination that the new master key is set in at least one HSM may be performed using different indicators and is not limited to using only the new-MK-set signal.

According to another advantageous embodiment, the method may also comprise sending an all-keys-re-ciphered-signal—in particular by the software component—to an HSM-set-new-MK-component for triggering a setting of all new master keys on all HSMs if it has been determined that all key objects having been encrypted with the current master key have been re-encrypted with a new master key. This activity may terminate the setting phase of a new master key in the HSMs. Thus, the loading phase for a new master key in the one or more HSMs may only be a transitional state in the process of making a new master key available, i.e., a temporary stage of a master key roll operation.

According to another advantageous embodiment, the method may also comprise, upon receiving a signal—in particular by the software component—that a new master key is loaded, generating, by the active software component, a new key (i.e., a new key value) using the HSM, storing, by the active software component, the new key in the curKey component of a key object, re-encrypting the new key, and storing the re-encrypted key in the newKey component of the key object if the re-encryption has been successful.

In other words, once a new master key is loaded—and in particular not activated, i.e., not set—a plurality of activities may happen under the control of the software component in order to prepare the local key(s) under the control of the software component for the following setting of the new master key in the one or more HSMs.

According to another embodiment, the method may also comprise upon the determining, by the software component, that the new master key is set in at least one HSM, and upon determining that a key object without a newKey component cannot be used with an HSM—e.g., if an error is triggered—delaying a usage of the key object until the new master key is set on the HSM. After a delay of the predetermined time, this part of the process can be triggered until no errors are triggered.

Such an error triggering may only happen for persistent keys which may also be used by other software components so that a conflicting newKey movement and HSM synchronization has taken place, i.e., a persistent key object that has been processed by another software component which had already moved the previous key to the curKey component of the respective key object.

According to another embodiment, the method may also comprise writing a value of the curKey component of a key object before moving a value of the newKey component to the curKey component of the key object. Hence, the key object may not only comprise the newKey and the curKey component but also an oldKey component. Consequently, the value of the curKey component may be written to the oldKey component before moving the value of the newKey component to the curKey. Thus, the keys of a software component may be kept for two generations of new master keys.

According to another advantageous embodiment, the method may further comprise upon starting—i.e., activating or starting execution—a software component, and upon determining that a master key change process is ongoing, determine a phase of the ongoing master key change process. This way, the newly started software component may integrate itself in the key roll process of other software components and the HSM changing to a new master key.

Also, additional embodiments may be possible for the proposed concept. E.g., the HSM may also comprise a register for a current master key and a register for the new master key. This way, a history of the master key changes may be managed by a controller for the HSM.

As another example, the signaling between the one or more HSMs and the software component may be coordinated and performed by an HSM management tool. As yet another example, the HSM management tool may communicate with the HSM event signaling tool which may be executed on a computer system on which the software component is also active. In yet another example, a respective new HSM master key signal may be sent to an HSM event signaling tool when a new HSM master key is set in the one or more HSMs.

Furthermore, the proposed concept may make use of the HSM event signaling tool sending a corresponding new HSM master key signal to a process using the one or more keys, when a respective new master key signal has been received from the HSM event signaling tool. Finally, a plurality of key objects may be persisted—i.e., stored permanently—in a repository.

It may also be taken into account that not only permanent keys may be managed by the software component, but also temporary keys of a software component. In some embodiments, for these temporary keys, key objects may be used comprising a curKey component and a newKey component. Thereby, the temporary keys may only be active as long as the software component may be activated; i.e., they do not survive a restart of the software component. For this, permanent keys may be used by the software component.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain hardware for storing, communicating, propagating or transporting the program for use, by, or in connection, with the instruction execution system, apparatus, or device. Such embodiments may be capable of executing functionality similar to the functionality discussed above with respect to the method and system, and thereby also realize the same advantages as discussed above with respect to the method and the system.

The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

It should be noted that embodiments of the present disclosure are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject matter, also any combination between features relating to different subject—matters, in particular, between features of the method type claims, and features of the apparatus type claims, is considered as to be disclosed within this document.

Figure 1:
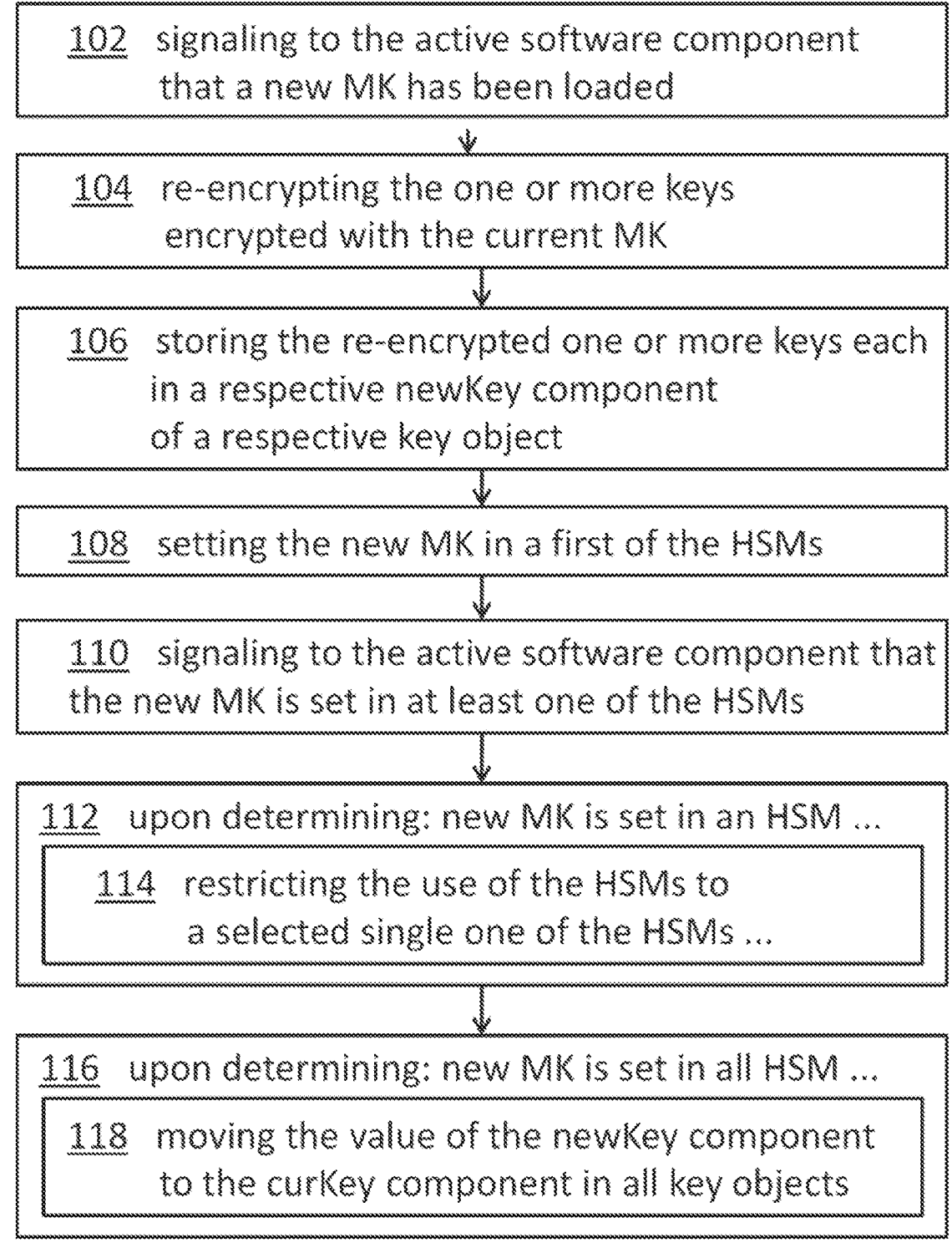

The aspects defined above and further aspects of the present disclosure are apparent from the examples of embodiments to be described hereinafter and are explained with reference to the examples of embodiments, to which the present disclosure is not limited. Various embodiments of the present disclosure will be described, by way of example only, and with reference to the following drawings:

FIG. 1 shows a block diagram of an embodiment of the method for updating a current master key with a new master key, both being protected by one or more hardware security modules (HSM), while a software component using one or more keys, each being encrypted by the current MK, is active, in accordance with embodiments of the present disclosure.

Figure 2:
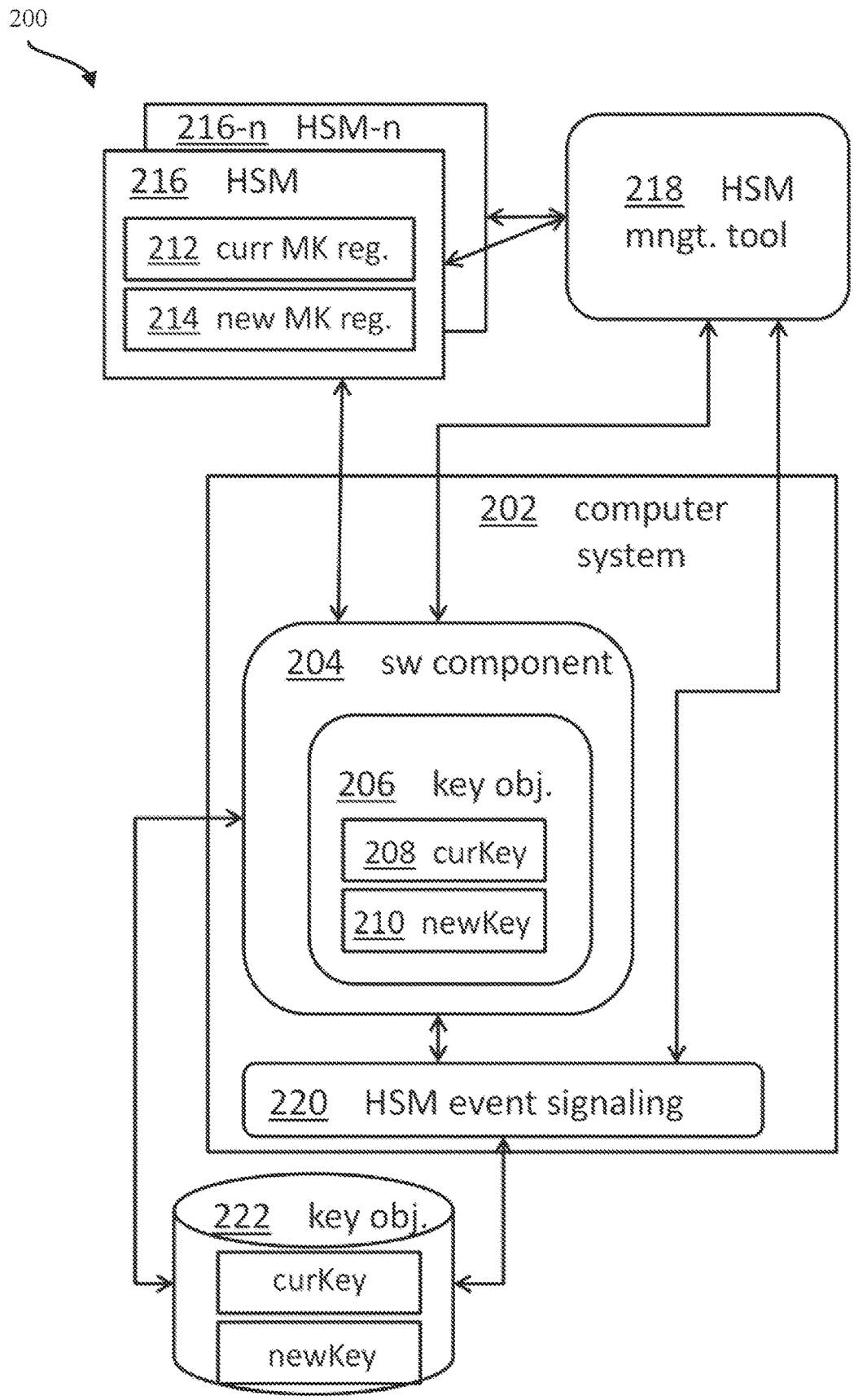

FIG. 2 shows a block diagram of an embodiment in which aspects of the present disclosure may be implemented, in accordance with embodiments of the present disclosure.

Figure 3:
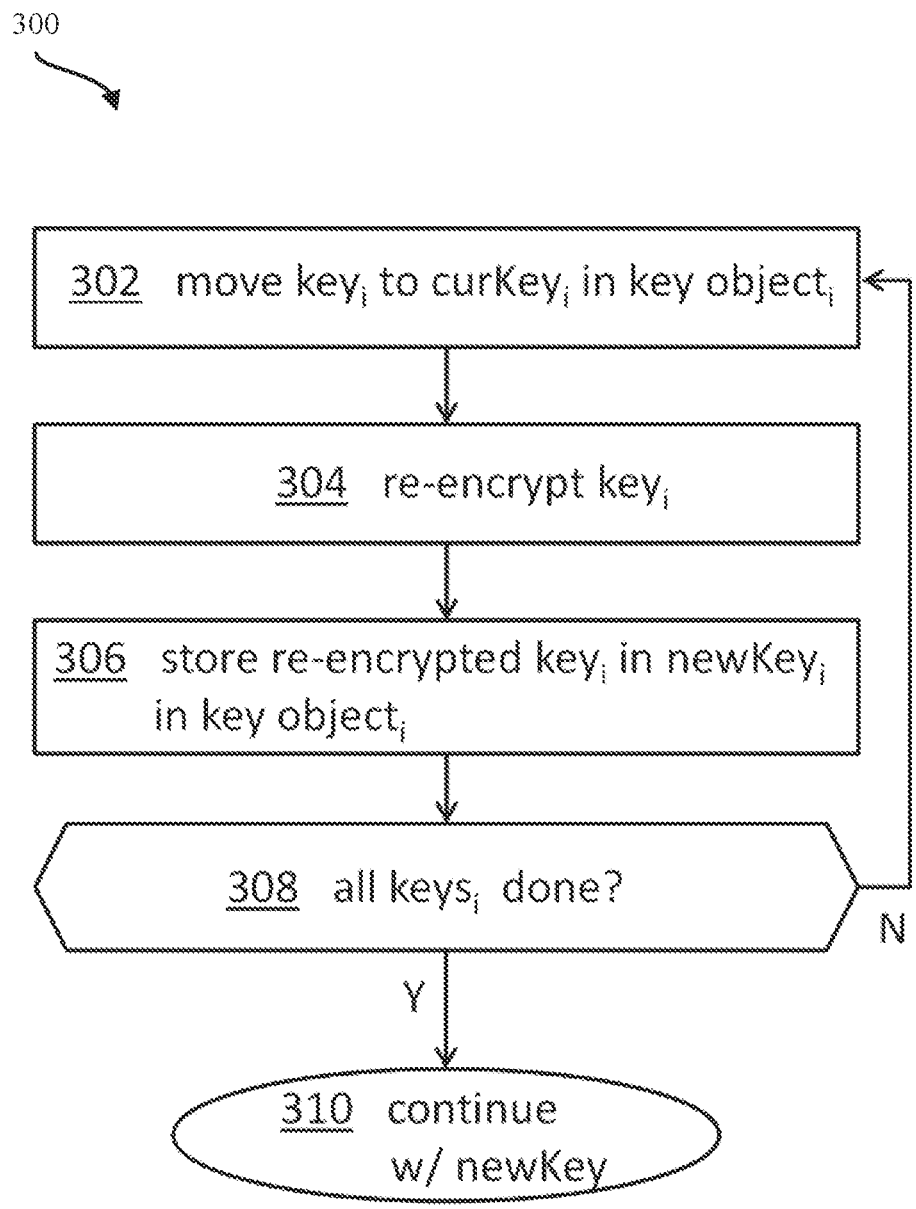

FIG. 3 shows a flowchart of an embodiment of the proposed concept reflecting stage III of Table 1, in accordance with embodiments of the present disclosure.

Figure 4:
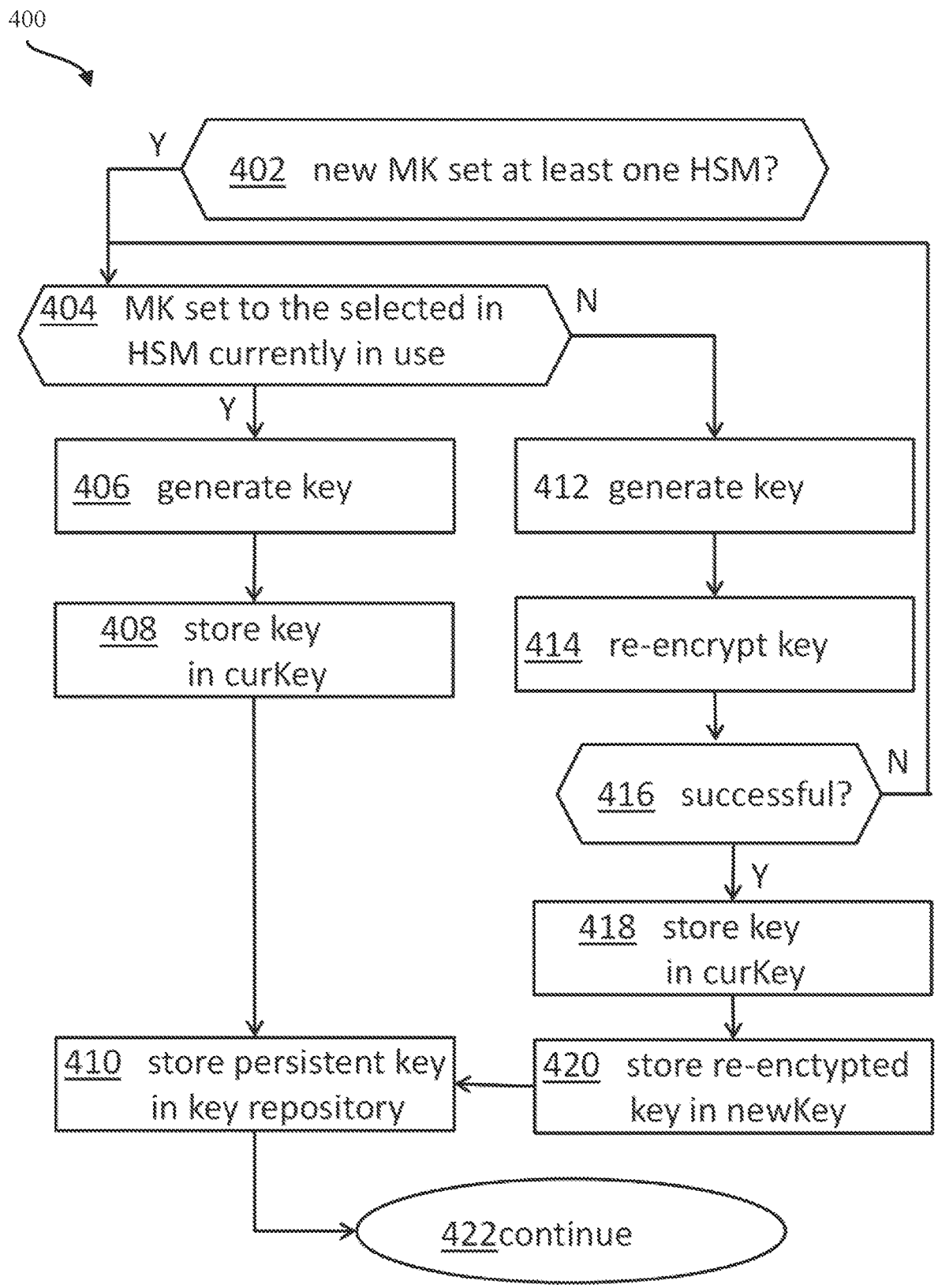

FIG. 4 shows a flowchart of an embodiment of the proposed concept reflecting stage V of Table 1, in accordance with embodiments of the present disclosure.

Figure 5:
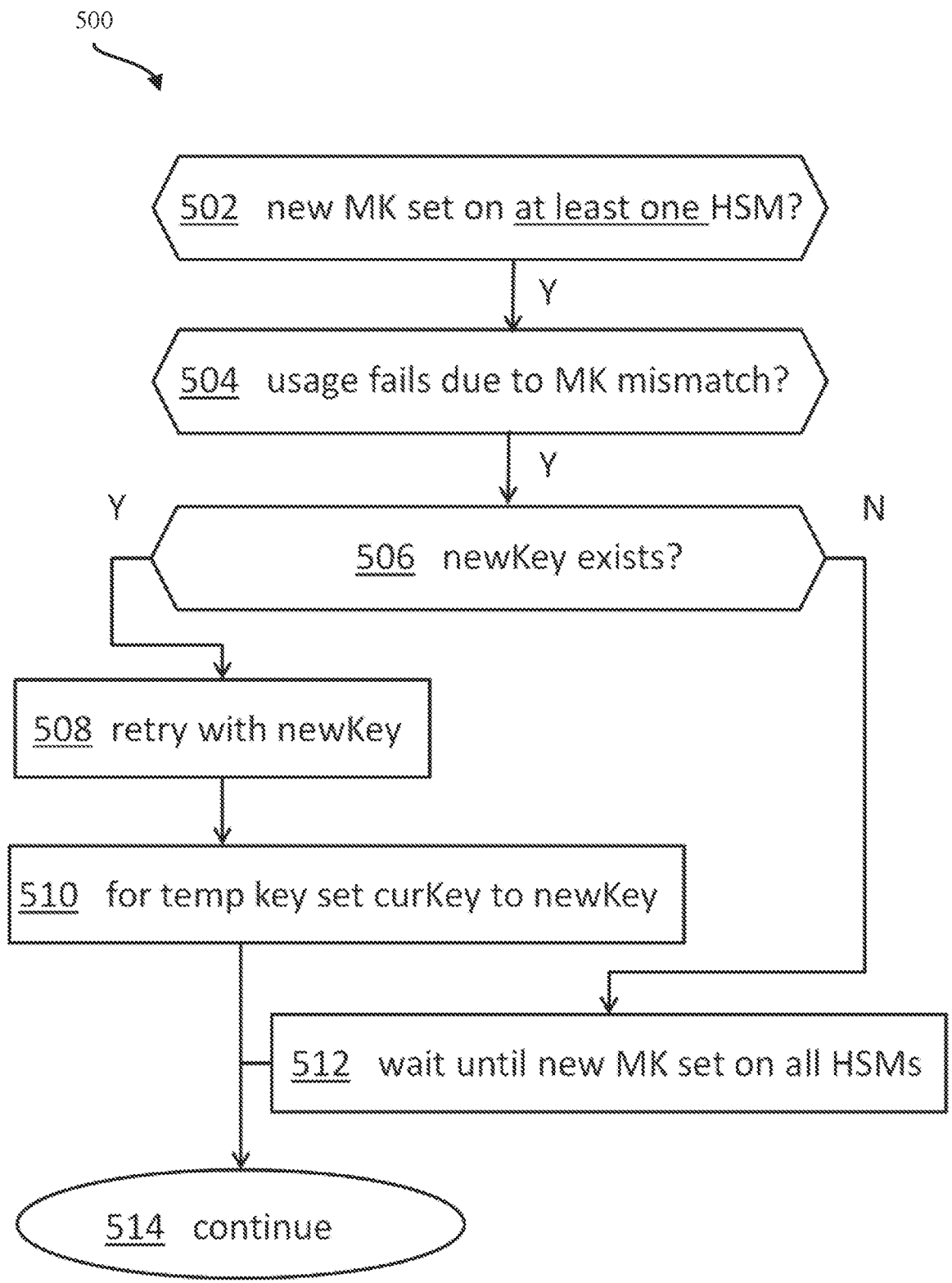

FIG. 5 shows another flowchart of an embodiment of the proposed concept reflecting another portion of stage V of Table 1, in accordance with embodiments of the present disclosure.

Figure 6:
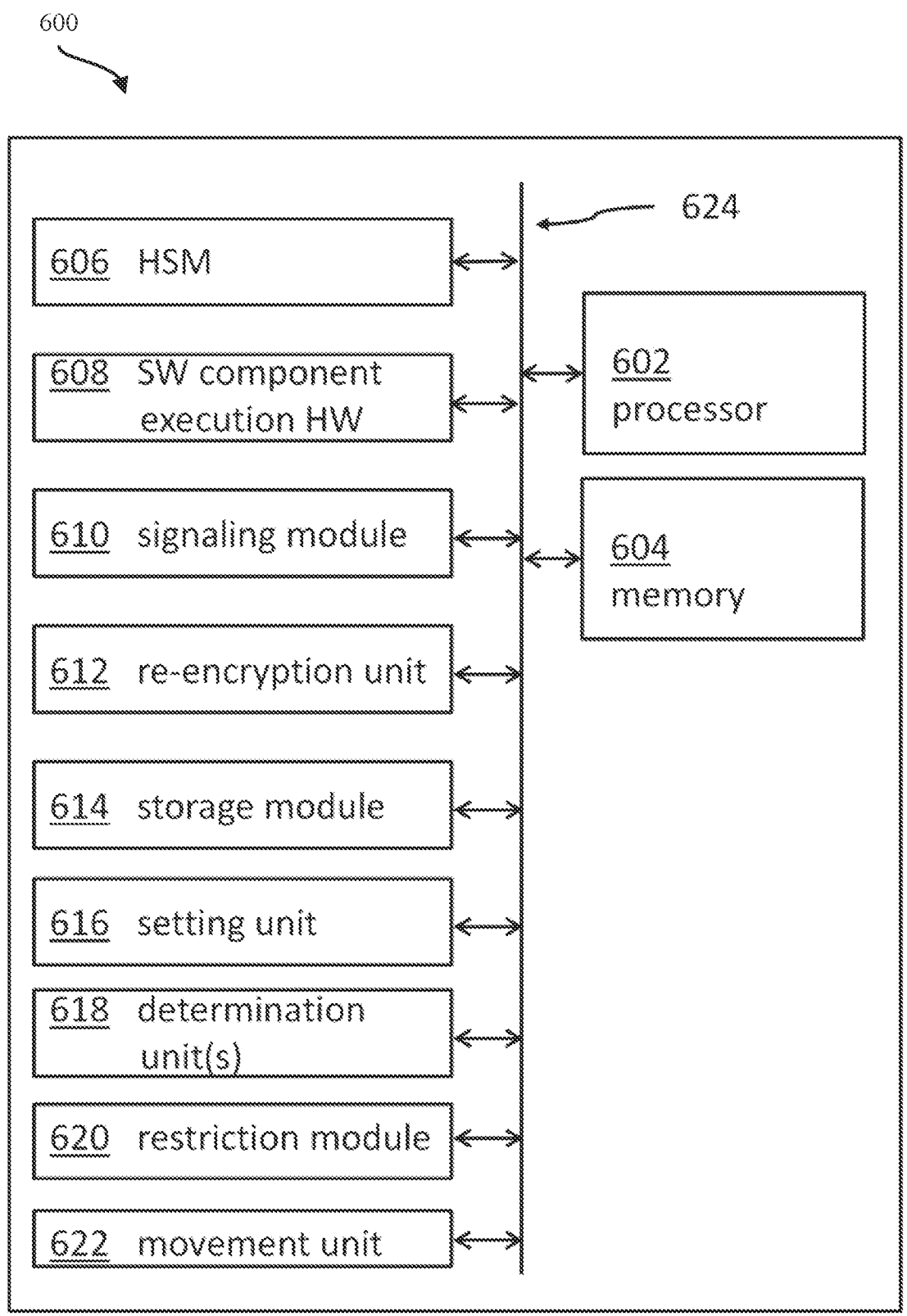

FIG. 6 shows a block diagram of an embodiment of the concurrent master key change system for updating a current master key with a new master key, in accordance with embodiments of the present disclosure.

Figure 7:
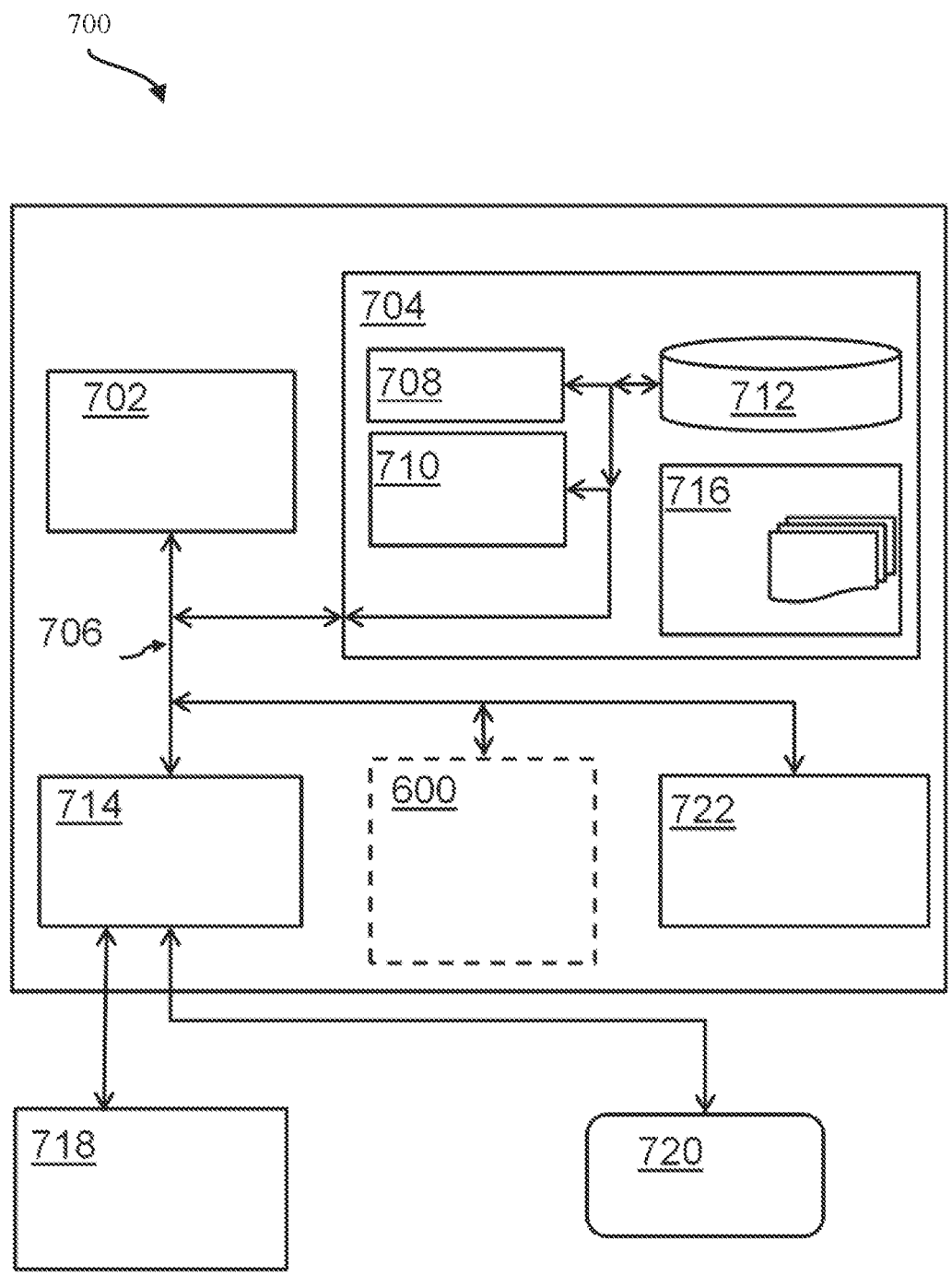

FIG. 7 shows an embodiment of a computing system comprising the system according to FIG. 6, in accordance with embodiments of the present disclosure.

Figure 8:
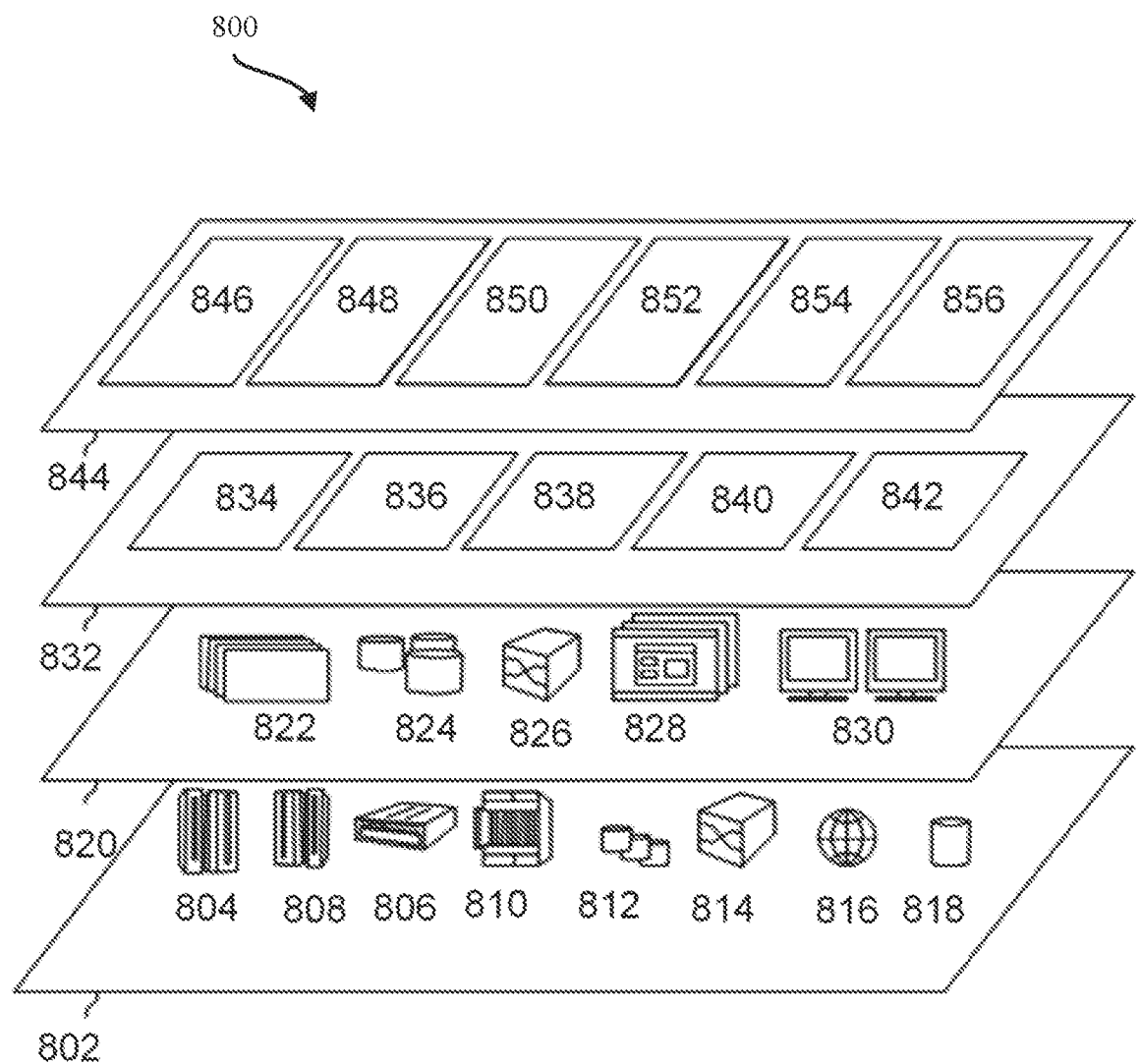

FIG. 8 shows a cloud computing environment in which at least parts of the present disclosure may be deployed, in accordance with embodiments of the present disclosure.

Figure 9:
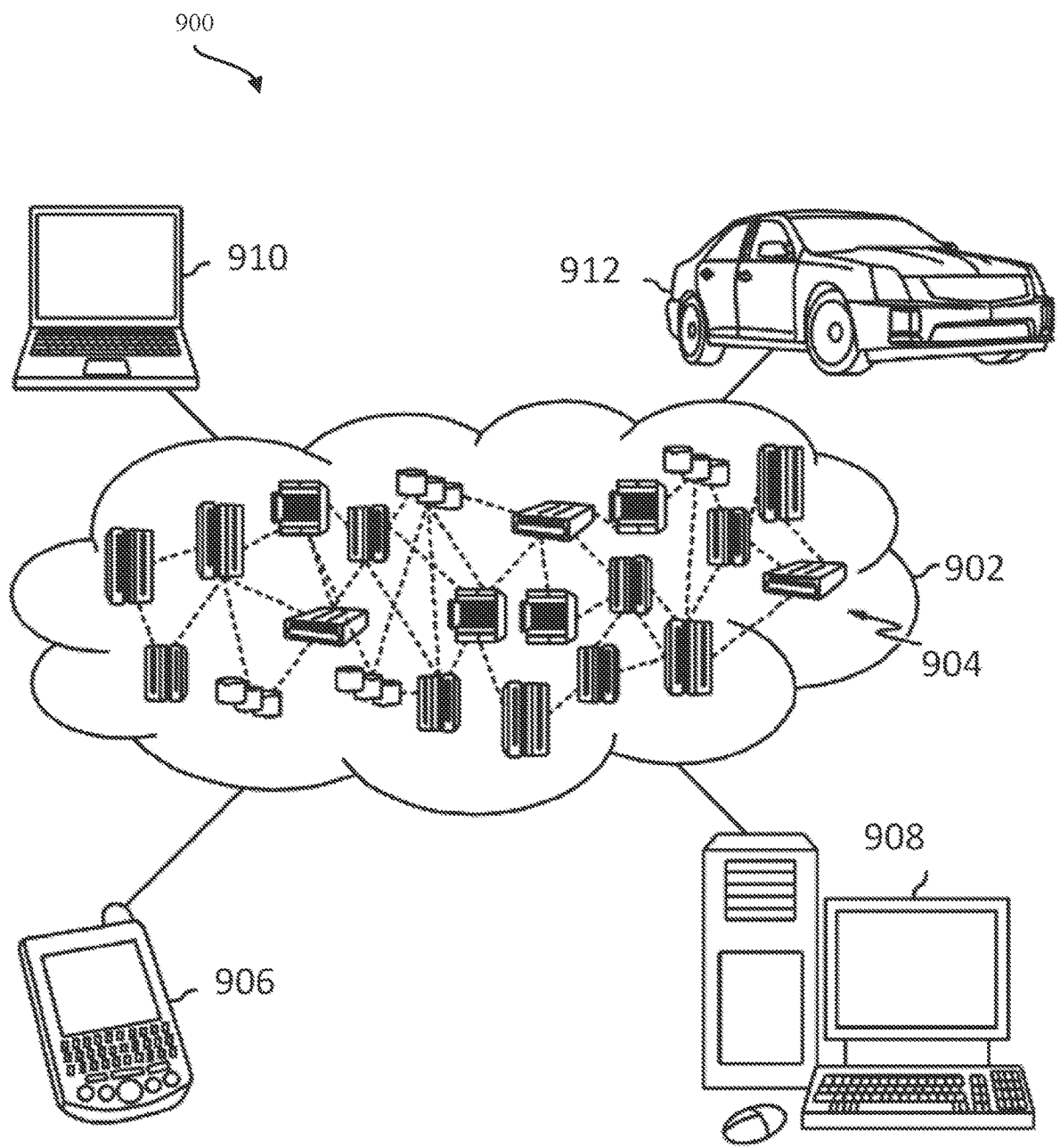

FIG. 9 shows components of a cloud computing environment, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward computer security, and, more specifically, to updating a current master key with a new master key protected by hardware security modules (HSM). While not limited to such applications, embodiments of the present disclosure may be better understood in light of the aforementioned context.

The present disclosure relates generally to a method for updating a current master key with a new master key protected by hardware security modules (HSM), while a software component that uses one or more local keys is active, and more specifically, to method for updating a current master key with a new master key, both being protected by one or more hardware security modules (HSM), while a software component using one or more keys, each encrypted by the current master key (MK), is active. The present disclosure relates further to a related concurrent master key change system for updating a current master key with a new master key, and a computer program product.

In the context of this description, the following conventions, terms and/or expressions may be used:

The term 'current master key' may denote a key used by a software component for encryption purposes. The master key may be used to encrypt a persistent or permanent key or a temporary key used by the software component. The temporary key may exist only as long as the software component is executed. A permanent key can survive the execution termination of the software component by storing the key in a key repository. This way, the key may also be used by different software components. The key itself is typically encrypted by a master key. This encryption may be performed with the help of an HSM which may hold the encryption master key. The current master key may be the one actually in use.

The term 'new master key' may denote a master key which should be used from a specific time on, in particular after a master key roll process which may denote a change of a master key in an HSM (or multiple HSMs). The new master key may be activated in different steps. A first step may be denoted as loading a new master key and the actual activation of the new master key may be denoted as setting the new master key.

The term 'hardware security modules (HSM)' may denote a physical computing device that safeguards and manages digital keys, performs encryption and decryption function of digital signatures, strong authentication, and/or other cryptographic functions. These modules traditionally come in the form of a plug-in card or an external device that attaches directly to a computer or network server. They also comprise one or more secure crypto-processor chips. HSMs are typically used for managing, controlling and safeguarding master keys used in other components of a computer or network system. Although stored safely in the HSM, security protocols require that also such master keys are renewed from time to time, i.e., undergo a master key roll process.

The term 'software component' may denote any form of executable code, e.g., in form of an application, a service, a Docker container, a virtual machine and so on. The software component may manage its own keys which may themselves be encrypted by the master key from one or more HSMs.

The term 'active' may denote the status of the software component during which the software component is executed or in a wait status, but clearly not terminated or not started.

The term 'one or more key' may denote that software component can manage and organize its own keys for different purposes. They may be persisted/permanent keys or temporary keys.

The term 're-encrypting' may denote a multistep process in which an encrypted term—e.g., a key managed by the software component—may be decrypted by an actual decryption key and newly encrypted by a new encryption key. In case of a symmetric key design, the actual decryption key and the original encryption key may be identical. However, the new encryption key can be different compared to the old or current encryption key.

The term 'key object' may denote a data or storage construct and able to differentiate between a current key, i.e., curKey, and a new key, i.e., newKey data value. Hence, the key object can be enabled to store two different key values. As an alternative embodiment, it may also be possible to store three different versions of a key: curKey, newKey and oldKey.

The term 'setting' may denote here in the context of an HSM that a new master key has been activated for use by the HSM. However, to activate the new master key, it should also have been previously loaded. In turn, the setting of the new master key requires that the new master key has been previously loaded.

The term 'curKey component' may denote the key currently used by the software component and which may soon be replaced by a new key. Both of these key versions may be protected by a master key provided by the HSM. However, the newKey used by the software component may be encrypted with a new master key from the HSM. Additionally, the software component may also use a new key value before it may be encrypted by the new master key.

The term 'newKey component' may denote the field or portion of the key object in which the new encrypted key value (encrypted by the new master key of the HSM) may be stored.

The term 'oldKey component' may denote a value of the key—or better its encrypted equivalent—after the current key at time to has been replaced by the newKey at time $t_1$ ($t_1 > t_0$).

Because the present disclosure may also be implemented in a cloud computing context, a couple of additional terms shall be defined:

The term 'cloud computing'—and equivalently the more specific term 'cloud service environment'—may in this context be interpreted as a model for enabling convenient, on-demand network access to a shared pool of configurable computing resources (e.g., networks, servers, storage, applications, and services) that can be rapidly provisioned and released with minimal management effort or service provider interaction. This cloud model promotes availability and is composed of at least five essential characteristics, three service models and four deployment models.

Essential characteristics of cloud computing comprise:

On-demand self-service. A consumer can unilaterally provision computing capabilities, such as server time and network storage, when needed automatically without requiring human interaction with each service provider.

Broad network access. Capabilities are available over the network and accessed through standard mechanisms that promote use by heterogeneous thin or thick client platforms (e.g., mobile phones, laptops, and PDAs).

Resource pooling. The provider's computing resources are pooled to serve multiple consumers using a multi-tenant model with different physical and virtual resources, dynamically assigned and reassigned according to consumer demand. There is a sense of location independence in that the customer generally has no control or knowledge over the exact location of the provided resources, but may be able to specify location at a higher level of abstraction (e.g., country, state, or datacenter). Examples of resources include storage, processing, memory, network bandwidth and virtual machines.

Rapid elasticity. Capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured Service. Cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both, the provider and consumer of the utilized service.

Service models for cloud computing use comprise:

Cloud Software as a Service (SaaS). The capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Cloud Platform as a Service (PaaS). The capability provided to the consumer is to deploy onto the cloud infrastructure consumer-created or acquired applications created using programming languages and tools supported by the provider. The consumer does not manage or control the underlying cloud infrastructure including network, servers, operating systems, or storage, but has control over the deployed applications and possibly applications hosting environment configurations.

Cloud Infrastructure as a Service (IaaS). The capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of selected networking components (e.g., host firewalls).

Deployment models for cloud computing comprise:

Private cloud. The cloud infrastructure is operated solely by an organization. It may be managed by the organization or a third party and may exist on premise or off premise.

Community cloud. The cloud infrastructure is shared by several organizations and supports a specific community that has shared concerns (e.g., mission, security requirements, policy, and compliance considerations). It may be managed by the organizations or a third party and may exist on premise or off premise.

Public cloud. The cloud infrastructure is made available to the general public or a large industry group and is owned by an organization selling cloud services.

Hybrid cloud. The cloud infrastructure is a composition of two or more clouds (private, community, or public) that remain unique entities but are bound together by standardized or proprietary technology that enables data and application portability (e.g., cloud bursting for load-balancing between clouds).

It may be noted that cloud software takes full advantage of the cloud paradigm by being service-oriented with a focus on statelessness (with exceptions), low coupling, modularity, and semantic interoperability.

In the following, a detailed description of the figures will be given. All instructions in the figures are schematic. Firstly, a block diagram of an embodiment of the method for updating a current master key with a new master key while a software component is active is given. Afterwards, further embodiments, as well as embodiments of the concurrent master key change system for updating a current master key with a new master key will be described.

FIG. 1 shows a block diagram of the method 100 for updating a current master key with a new master key, both being protected by one or more hardware security modules (HSM), while a software component using one or more keys, each one being encrypted by the current master key (MK), is active. I.e., the current master key and the new MK can both be stored on/in the HSM in an encrypted form.

A software component, e.g., a software service, an application program, a virtual machine, a Docker container, etc., can use one or more keys for its own operation. These keys can also be protected by a master key—a current MK, i.e., curKey—or the new MK—i.e., the newKey. The key(s) the software component is using can either be persistent/permanent; i.e., they are stored in a persistent storage or they are only temporary, i.e., they are only valid until the software component terminates its execution. However, the protection options are the same.

The problem is updating the master key while the software component is executed is addressed in the following way by the method 100. Firstly, it is signaled, 102, (typically event based) to the active software component that a new master key has been loaded to the one or more HSMs. There are different ways to achieve this which do not need to be discussed as they would be understood by one skilled in the art.

Then, the software component re-encrypts, 104, the one or more keys encrypted with the current MK, which can also be triggered by the signaling 102. The re-encryption comprises at least the steps decrypting with the current master key and encrypting again with the new master key.

The re-encrypted one or more keys are each stored, 106, in a respective newKey component of a respective key object used by the active software component. Such a key object shall exist for each key used by the software component. The key object has a storage position for at least the current key—i.e., curKey (the key encrypted with the former master key)—and the new key—i.e., newKey (the key already encrypted with the new master key). Both key portions shall be stored in encrypted form in the respective key object.

Then, the method 100 comprises setting, 108—i.e., activating/replacing curMK by newMK—the new master key in a first of the HSMs, and signaling, 110, to the active software component that the new master key is set in at least one of the HSMs.

Upon determining, 112 (e.g., event based or error activated by the software component if, e.g., the used key does not work) by the software component, that the new master key is set in at least one HSM, restricting, 114, by the software component, the use of the HSMs to a selected single one of the HSMs, using a respective value stored in a key component selected from the group consisting of: the curKey component, and the newKey component of the respective key object depending on the selected HSM. The single one of the HSM is typically the one holding the new master key; however, it can also be one with the old master key, e.g. if the HSM with the new master key set is not accessible at selection time.

Furthermore, the method 100 comprises upon determining, 116, that the new master key is set in all HSMs, moving, 118, the value of the newKey component to the curKey component in all key objects. Thus, a complete master key change cycle is performed without stopping the execution of the software component, as current master key roll approaches typically require. Accordingly, it is no longer necessary to restrict the use of the HSMs to a selected single one of the HSMs as referred to by the reference numeral 114. The restriction can thus be released.

FIG. 2 shows a block diagram of components of an embodiment 200 in which aspects of the present disclosure may be advantageously used and which will now be described in context. A computer system 202 can be configured for executing a software component 204 or process. The software component 204 may use or manage one or more keys which are here represented as key objects 206 with at least two entries or portions for the current key, i.e., curKey 208, which is typically encrypted with a current or actual master key (MK) 212 managed in the HSM 216. The key object 206 also comprises another portion for storing a newKey 210 which is typically a newly generated key of the software component 204 encrypted with a new master key 214 (new MK) of the HSM 216. As indicated, a plurality of HSMs 216-$n$ (HSM-n) can be used, where n can represent any positive integer.

It should also be noted, that each HSM 216 can have a current master key 212 (cur MK) register having stored the master key that is actually set. Additionally, there is also a new master key 214 (new MK) register for storing a new master key which may actually be loaded but not yet set as the current master key 212.

The HSM(s) 216 are typically managed by the HSM management tool 218 which is supported by the HSM event signaling tool 220. The key repository 222 can store persistent key objects comprising the elements or portions curKey and newKey of keys used by one or more software components or applications or services. For temporary keys, the key objects 206 only exists as long as the software component 204 is executed. Communication paths between the different components of the embodiment 200 shown here will become comprehensible in the context of the flowcharts, described in the following section.

A couple of stages of the master key role process can be differentiated as shown below in Table 1:

TABLE 1

STAGES OF MASTER KEY ROLE PROCESS

| stage | HSM management | HSM event signaling tool | process |
|---|---|---|---|
| 1. load new MK to HSMs | issue commands to load new MKs to all HSM's | | |
| 2. new MKs fully loaded on all HSM's | | signal "start of MK role process" to software components | |
| 3. re-encrypt stage | | re-encrypted keys in key repository; store re-encrypted keys to newKey | Re-encrypted keys to be used; background re-encrypt temp. keys |
| 4. all keys re-encrypted | | forward "all keys re-encrypted" report to HSM management | report on "keys re-encrypted" to HSM event signaling tool |
| 5. new MK set on at least one HSM | start setting new MKs; optional: communicate this to HSM event signaling tool | optional: forward new state to software component | if observed by event or error: select a single HSM for use; special handling of key usage of key generation |
| 6. all new MKs set on all HSMs | communicate state to event signaling tool | communicate state to software components; replace curKey by newKey in key repository | enabled all HSMs, if newKey exists move newKey to curKey before using the key; background process moving newKey to curKey for tend keys |

The following three figures refer to different stages of Table 1.

FIG. 3 shows a method 300 of the re-encryption stage 3 of Table 1. Each key, used by the software component has been or is moved, 302, to the field curKey$_i$ of the key-object$_i$. The actually used key$_i$ is re-encrypted, 304, i.e., decrypted with the old master key and newly encrypted with a new master key of the respective HSM. Then, the re-encrypted key, is stored, 306, in the portion of new key$_i$ of the key-object$_i$. Then, it is determined, 308 whether all keys, (persistent/permanent and/or temporary keys) used by the software component have undergone this process. If that is not the case—case "N"—the method 300 loops back to the beginning; and if all keys have been re-encrypted, the process continues, 310, its operation with the newKey.

FIG. 4 shows a method 400 of stage 5 of Table 1, i.e., for the case that a new master key is set on at least one HSM. If this has been determined, 402, and if it is determined, 404, that a new master key is set in the selected to the HSM currently used (i.e., to which the usage is restricted), a key is generated, 406, inside the software component and the actually used key of the software component is stored, 408, in the portion curKey of the respective key object by the software component. Persistent keys are then stored, 410, in the related key repository.

If during the determination 404 it is determined that the new master key is not set on the single one HSM currently used—case "N"—also in this branch a key is generated, 412, by the software component and re-encrypted, 414, as newKey with the new master key of the respective HSM. As an additional step, also a newly generated key may be used by the software component. The encryption with the new master key can fail because the new master key has been set—i.e., activated—already so that the new MK register is empty and no re-encryption is possible. If this part of the process was not successful (determination 416)—case "N"—the process returns to the determination 404. Otherwise—case "Y"—the process continues to store, 418 the actually used key in the field curKey of the respective key object and the re-encrypted key is stored, 420, in the field newKey of the respective key object. Then, the process continues to store, 410 persistent keys in the key repository and continue, 422, the ongoing processes of the software component.

FIG. 5 shows other a method 500 of stage 5 of Table 1. Also here, the starting point is a determination 502 that a new master key has been set on at least one HSM. If that is the case—case "Y"—then the method 500 can determine, 504, if the usage of the key fails due to a master key mismatch. If that is the case—case "Y"—a determination 506 is made whether a newKey exists in the respective key object. If that is the case—case "Y"—a retry 508 is made with the newKey. Also, for temporary keys, the content of the field curKey of the respective key component is set, 510, to the field newKey. Then, the software component can continue, 514, its normal operation.

Alternatively, if no newKey exists during the determination 506—case "N"—the process waits, 512, until a new master key is set on all HSMs. Then, the process can continue, 514, its normal operations.

FIG. 6 shows a block diagram of an embodiment of the concurrent master key change system 600 for updating a current master key with a new master key, both being protected by one or more hardware security modules (HSM) 606 (compare also FIG. 2, 216, 216-n), while a software component executed on an execution hardware 608 (compare also FIG. 2, 202; such correspondences may also be used for other components between FIG. 2 and FIG. 6) using one or more keys (i.e., key objects), each being encrypted by the current MK, is active. The concurrent master key change system 600 comprises a processor 602 and a memory 604, communicatively coupled to said processor, 602. Thereby, the memory 604 stores program code portions that when executed, enable the processor 602, to signal—using an HSM management tool, and in particular a signaling module 610—to the active software component executed on the execution hardware 608 that a new master key has been loaded to the one or more HSMs 606.

The processor 602 is also enabled to support re-encrypting—in particular, by a re-encryption unit 612 controlled by the execution of the active software component executed on the execution hardware 608 for enabling the re-encryption inside the HSM 606—the one or more keys encrypted with the current master key. The processor 602 is also enabled to support storing—in particular, using a key object storage module 614—the re-encrypted one or more keys each in a respective newKey component of a respective key object used by the active software component, where a respective current key, encrypted by the current MK, is stored in a respective curKey component of the respective key object.

The processor 602 can also support a setting—in particular by a setting unit 616—the new master key in a first of the HSMs, and signaling—in particular by the signaling module 610 or a second signaling module—to the active software component that the new master key is set in at least one of the HSMs.

Furthermore, the processor 602 is also enabled to: upon determining, in particular, by a first determination unit 618 controlled by the software component, that the new master key is set in at least one HSM 606, and restrict—in particular, by a restriction module 620, controlled by the software component—the use of the HSMs to a selected single one of the HSMs, using a respective value stored in a key component selected from a group consisting of: the curKey component and the newKey component of the respective key object depending on the selected HSM.

Furthermore, the processor 602 is also enabled to: upon determining—in particular, by a second determination unit (not shown) or the same determination unit 618—that the new master key is set in all HSMs, move—in particular, by a key movement unit 622—the value of the newKey component to the curKey component in all key objects.

It shall also be mentioned that all functional units, modules and functional blocks may be communicatively coupled to each other for signal or message exchange in a selected 1:1 manner, in particular, the processor 602, the memory 604, the HSM(s) 606, the software component execution hardware 608, the signaling module 610, the re-encryption unit 612, the storage module 614, the setting unit 616, the determination unit 618, the restriction module 620, and the movement unit 622. Alternatively, the functional units, modules and functional blocks can be linked to a system internal bus system 624 for a selective signal or message exchange.

Embodiments of the present disclosure may be implemented together with virtually any type of computer, regardless of the platform being suitable for storing and/or executing program code.

FIG. 7 shows, as an example, a computing system 700 suitable for executing program code related to the proposed method.

The computing system 700 is only one example of a suitable computer system, and is not intended to suggest any limitation as to the scope of use or functionality of embodiments of the present disclosure described herein, regardless, whether the computer system 700 is capable of being implemented and/or performing any of the functionality set forth hereinabove. In the computer system 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 700 is shown in the form of a general-purpose computing device. The components of computer system/server 700 may include, but are not limited to, one or more processing units or processors 702, a system memory 704, and a bus 706 that couple various system components including system memory 704 to the processor 702. Bus 706 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random access memory (RAM) 708 and/or cache memory 710. Computer system/server 700 may further include other removable/non-removable, volatile/non-volatile computer system storage media. By way of example only, a storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, memory 704 may include at least one program product having a set (e.g., at least one) of program modules that are configured to carry out the functions of embodiments of the present disclosure.

The program/utility, having a set (at least one) of program modules 716, may be stored in memory 704 by way of example, and not limiting, as well as an operating system, one or more application programs, other program modules, and program data. Each of the operating systems, one or more application programs, other program modules, and program data or some combination thereof, may include an implementation of a networking environment. Program modules 716 generally carry out the functions and/or methodologies of embodiments of the present disclosure, as described herein.

The computer system/server 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of the computer system/server 700 via bus 706. It should be understood that, although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

Additionally, the concurrent master key change system 600 for updating a current master key with a new master key may be attached to the bus 706.

FIG. 8 shows a cloud computing environment 800 in which at least parts of the present disclosure may be deployed. A set of functional abstraction layers provided by a cloud computing environment is shown. It should be understood in advance that the components, layers, and functions, shown in FIG. 8, are intended to be illustrative only, and embodiments of the present disclosure are not limited thereto. As depicted, the following layers and corresponding functions are provided: Hardware and software layer 802 include hardware and software components. Examples of hardware components include: mainframes 804; servers 806; RISC (Reduced Instruction Set Computer) architecture based servers 808; blade servers 810; storage devices 812; networks and networking components 814. In some embodiments, software components include network application server software 816 and/or database software 818.

Virtualization layer 820 provides an abstraction layer from which the following examples of virtual entities may be provided: virtual servers 822; virtual storage 824; virtual networks 826, including virtual private networks; virtual applications and operating systems 828; and virtual clients 830. In one example, management layer 832 may provide the functions described below. Resource provisioning 834 provides dynamic procurement of computing resources and other resources that are utilized to perform tasks within the cloud computing environment. Metering and pricing 836 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 838 provides access to the cloud computing environment for consumers and system administrators. Service level management 840 provides cloud computing resource allocation and management such that required service levels are met. Service Level Agreement (SLA) planning and fulfillment 842 provides pre-arrangement for, and procurement of, cloud computing resources for which a future requirement is anticipated in accordance with an SLA.

Workload layer 844 provides examples of functionality for which the cloud computing environment may be utilized. Examples of workloads and functions which may be provided from this layer include: mapping and navigation 846; software development and lifecycle management 848; virtual classroom education delivery 850; data analytics processing 652; transaction processing 854; and the concurrent master key change system 856 (compare also FIG. 6, 600).

FIG. 9 shows components 900 of a cloud computing environment 902. As shown, cloud computing environment 902 comprises one or more cloud computing nodes 904 with which local computing devices used by cloud consumers, such as, for example, personal digital assistant (PDA) or cellular telephone 906, desktop computer 908, laptop computer 910, and/or automobile computer system 912 may communicate. Nodes 904 may communicate with one another. They may be grouped (not shown) physically or virtually, in one or more networks, such as Private, Community, Public, or Hybrid clouds as described hereinabove, or a combination thereof. This allows cloud computing environment 902 to offer infrastructure, platforms and/or software as services for which a cloud consumer does not need to maintain resources on a local computing device. It is understood that the types of computing nodes 904 shown in FIG. 9 are intended to be illustrative only and that computing nodes 904 and cloud computing environment 902 can communicate with any type of computerized device over any type of network and/or network addressable connection (e.g., using a web browser).

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present disclosure may be embodied as a system, a method, and/or a computer program product. The computer program product may include a computer readable storage medium (or media) having computer readable program instructions thereon for causing a processor to carry out aspects of the present disclosure.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the disclosure. As used herein, the singular forms a, an and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope and spirit of the present disclosure. The embodiments are chosen and described in order to best explain the principles of the present disclosure and the practical application, and to enable others of ordinary skills in the art to understand the present disclosure for various embodiments with various modifications, as are suited to the particular use contemplated.

A non-limiting list of examples will now be described: Example 1 is a method for updating a current master key with a new master key, both being protected by one or more hardware security modules (HSM), while an active software component using one or more keys, each being encrypted by the current master key, is active, the method comprising: signaling to the active software component that the new master key has been loaded to the one or more HSMs; re-encrypting, by the software component, the one or more keys encrypted with the current master key; storing the re-encrypted one or more keys each in a respective newKey component of a respective key object used by the active software component, wherein a respective current key, encrypted by the current master key, is stored in a respective curKey component of the respective key object; setting the new master key in a first of the HSMs; signaling to the active software component that the new master key is set in at least one of the HSMs; upon determining, by the software component, that the new master key is set in at least one HSM, restricting, by the software component, use of the HSMs to a selected single one of the HSMs, using a respective value stored in a key component selected out of a group consisting of: the respective curKey component, and the respective newKey component; and upon determining that the new master key is set in all HSMs, moving the respective value of the respective newKey component to the respective curKey component in all key objects.

Example 2 includes the features of Example 1. In this example, the method further comprises: upon determining, by an HSM event signaling tool, one selected from a group consisting of: a master key load operation, and a master key set operation on the one or more HSMs, signaling a respective event to the active software component.

Example 3 includes the features of any one of Examples 1 to 2. In this example, the method further comprises: upon determining, by an HSM event signaling tool, a master key load operation on the one or more HSMs, re-encrypting key objects persistently stored in a key repository.

Example 4 includes the features of any one of Examples 1 to 3. In this example, the method further comprises: upon determining, by an HSM event signaling tool, that master key set operations have been performed on all HSMs, moving a value of the newKey component of the key object to the curKey component of the key objects persistently stored in a key repository.

Example 5 includes the features of any one of Examples 1 to 4. In this example, the determining, by the software component, that the new master key is set in at least one HSM, further comprises at least one selected from a group consisting of: receiving, by the software component, a new-MK-set signal; and determining, by the software component, that an error code has been received indicative of a usage of a curKey component of a local key which was encrypted with a non-actual master key.

Example 6 includes the features of any one of Examples 1 to 5. In this example, the method further comprises: upon determining that all key objects encrypted with the current master key have been re-encrypted, sending an all-keys-re-ciphered-signal to an HSM-set-new-MK-component for triggering a setting of all new master keys on all HSMs.

Example 7 includes the features of any one of Examples 1 to 6. In this example, the method further comprises upon receiving a signal that the new master key is loaded: generating, by the active software component, a new key using the HSM; storing, by the active software component, the new key in the curKey component of a key object; re-encrypting the new key; and storing the re-encrypted key in the newKey component of the key object.

Example 8 includes the features of any one of Examples 1 to 7. In this example, the method further comprises, upon the determining, by the software component, that the new master key is set in at least one HSM, and that a key object without a newKey component cannot be used with the at least one HSM: delaying a usage of the key object until the new master key is set on the at least one HSM.

Example 9 includes the features of any one of Examples 1 to 8. In this example, the method further comprises: writing a value of the curKey component of a key object before moving a value of the newKey component to the curKey component of the key object.

Example 10 includes the features of any one of Examples 1 to 9. In this example, the method further comprises upon starting the active software component, and determining that a master key change process is ongoing: determining a phase of the ongoing master key change process.

Example 11 is a concurrent master key change system for updating a current master key with a new master key, both being protected by one or more hardware security modules (HSM), while an active software component using one or more keys, each being encrypted by the current master key, is active, the concurrent master key change system comprising: a processor and a memory, communicatively coupled to the processor, wherein the memory stores program code portions that when executed, enable the processor to perform a method comprising according to any one of Examples 1 to 10.

Example 12 is a computer program product for updating a current master key with a new master key, both being protected by one or more hardware security modules (HSM), while an active software component using one or more keys, each being encrypted by the current master key, is active, the computer program product comprising a computer readable storage medium having program instructions embodied therewith, the program instructions being executable by one or more computing systems to cause the one or more computing systems to perform a method according to any one of Examples 1 to 10.

What is claimed is:

1. A method for updating a current master key with a new master key, both being protected by one or more hardware security modules (HSM), while an active software component using one or more keys, each being encrypted by the current master key, is active, the method comprising:
   signaling to the active software component that the new master key has been loaded to the one or more HSMs;
   re-encrypting, by the software component, the one or more keys encrypted with the current master key;
   storing the re-encrypted one or more keys each in a respective newKey component of a respective key object used by the active software component, wherein a respective current key, encrypted by the current master key, is stored in a respective curKey component of the respective key object;
   setting the new master key in a first of the HSMs;
   signaling to the active software component that the new master key is set in at least one of the HSMs;
   upon determining, by the software component, that the new master key is set in at least one HSM, restricting, by the software component, use of the HSMs to a selected single one of the HSMs, using a respective value stored in a key component selected out of a group consisting of: the respective curKey component, and the respective newKey component; and
   upon determining that the new master key is set in all HSMs, moving the respective value of the respective newKey component to the respective curKey component in all key objects.

2. The method according to claim 1, further comprising:
   upon determining, by an HSM event signaling tool, one selected from a group consisting of: a master key load operation, and a master key set operation on the one or more HSMs, signaling a respective event to the active software component.

3. The method according to claim 1, further comprising:
   upon determining, by an HSM event signaling tool, a master key load operation on the one or more HSMs, re-encrypting key objects persistently stored in a key repository.

4. The method according to claim 1, further comprising:
   upon determining, by an HSM event signaling tool, that master key set operations have been performed on all HSMs, moving a value of the newKey component of the key object to the curKey component of the key objects persistently stored in a key repository.

5. The method according to claim 1, wherein the determining, by the software component, that the new master key is set in at least one HSM, further comprises at least one selected from a group consisting of:
   receiving, by the software component, a new-MK-set signal; and
   determining, by the software component, that an error code has been received indicative of a usage of a curKey component of a local key which was encrypted with a non-actual master key.

6. The method according to claim 1, further comprising:
   upon determining that all key objects encrypted with the current master key have been re-encrypted, sending an all-keys-re-ciphered-signal to an HSM-set-new-MK-component for triggering a setting of all new master keys on all HSMs.

7. The method according to claim 1, further comprising upon receiving a signal that the new master key is loaded:
   generating, by the active software component, a new key using the HSM;
   storing, by the active software component, the new key in the curKey component of a key object;
   re-encrypting the new key; and
   storing the re-encrypted key in the newKey component of the key object.

8. The method according to claim 1, further comprising, upon the determining, by the software component, that the new master key is set in at least one HSM, and that a key object without a newKey component cannot be used with the at least one HSM:
   delaying a usage of the key object until the new master key is set on the at least one HSM.

9. The method according to claim 1, further comprising:
   writing a value of the curKey component of a key object before moving a value of the newKey component to the curKey component of the key object.

10. The method of claim 1, further comprising upon starting the active software component, and determining that a master key change process is ongoing:
  determining a phase of the ongoing master key change process.

11. A concurrent master key change system for updating a current master key with a new master key, both being protected by one or more hardware security modules (HSM), while an active software component using one or more keys, each being encrypted by the current master key, is active, the concurrent master key change system comprising:
  a processor and a memory, communicatively coupled to the processor, wherein the memory stores program code portions that when executed, enable the processor to perform a method comprising:
    signaling to the active software component that the new master key has been loaded to the one or more HSMs;
    re-encrypting, by the software component, the one or more keys encrypted with the current master key;
    storing the re-encrypted one or more keys each in a respective newKey component of a respective key object used by the active software component, wherein a respective current key, encrypted by the current master key, is stored in a respective curKey component of the respective key object;
    setting the new master key in a first of the HSMs,
    signaling to the active software component that the new master key is set in at least one of the HSMs;
    upon determining, by the software component, that the new master key is set in at least one HSM, restricting, by the software component, use of the HSMs to a selected single one of the HSMs, using a respective value stored in a key component selected from a group consisting of: the respective curKey component, and the respective newKey component; and
    upon determining that the new master key is set in all HSMs, moving the respective value of the respective newKey component to the respective curKey component in all key objects.

12. The concurrent master key change system according to claim 11, wherein the processor is further enabled to, upon determining, by an HSM event signaling tool, one selected from a group consisting of: a master key load operation, and a master key set operation on the one or more HSMs:
  signaling a respective event to the active software component.

13. The concurrent master key change system according to claim 11, wherein the processor is further enabled to, upon determining, by an HSM event signaling tool, a master key load operation on the one or more HSMs:
  re-encrypting key objects persistently stored in a key repository.

14. The concurrent master key change system according to claim 11, wherein the processor is further enabled to upon determining, by an HSM event signaling tool, that master key set operations have been performed on all HSMs:
  moving a value of the newKey component of the key object to the curKey component of the key objects persistently stored in a key repository.

15. The concurrent master key change system according to claim 11, wherein when determining, by the software component, that the new master key is set in at least one HSM, the processor is further enabled to perform at least one selected from a group consisting of:
  receiving, by the software component, a new-MK-set signal; and
  determining, by the software component, that an error code has been received indicative of a usage of a curKey component of a local key which was encrypted with a non-actual master key.

16. The concurrent master key change system according to claim 11, wherein upon determining that all key objects having been encrypted with the current master key have been re-encrypted, the processor is further enabled to:
  sending an all-keys-re-ciphered-signal to an HSM-set-new-MK-component for triggering a setting of all new master keys on all HSM.

17. The concurrent master key change system according to claim 11, wherein upon receiving a signal that the new master key is loaded, the processor is further enabled to perform the method further comprising:
  generating, by the active software component, a new key using the HSM;
  storing, by the active software component, the new key in the curKey component of a key object;
  re-encrypting the new key; and
  storing the re-encrypted key in the newKey component of the key object.

18. The concurrent master key change system according to claim 11, wherein upon the determining, by the software component, that the new master key is set in at least one HSM, and upon determining that a key object without a newKey component cannot be used with an HSM, the processor is further enabled to perform the method further comprising:
  delaying a usage of the key object until the new master key is set on the HSM.

19. The concurrent master key change system according to claim 11, wherein the processor is further enabled to perform the method further comprising:
  writing a value of the curKey component of a key object before moving a value of the newKey component to the curKey component of the key object.

20. A computer program product for updating a current master key with a new master key, both being protected by one or more hardware security modules (HSM), while an active software component using one or more keys, each being encrypted by the current master key, is active, the computer program product comprising a computer readable storage medium having program instructions embodied therewith, the program instructions being executable by one or more computing systems to cause the one or more computing systems to:
  signal to the active software component that the new master key has been loaded to the one or more HSMs;
  re-encrypt, by the software component, the one or more keys encrypted with the current master key;
  store the re-encrypted one or more keys each in a respective newKey component of a respective key object used by the active software component, wherein a respective current key, encrypted by the current master key, is stored in a respective curKey component of the respective key object;
  set the new master key in a first of the HSMs;
  signal to the active software component that the new master key is set in at least one of the HSMs;
  upon determining, by the software component, that the new master key is set in at least one HSM, restrict, by the software component, use of the HSMs to a selected single one of the HSMs, using a respective value stored in a key component selected out of a group consisting of: the respective curKey component, and the respective newKey component; and upon determining that the new master key is set in all HSMs, moving the respective value of the respective newKey component to the respective curKey component in all key objects.

* * * * *